Patented Feb. 1, 1944

2,340,528

UNITED STATES PATENT OFFICE

2,340,528

CONDENSATION PRODUCTS FROM SUBSTANCES OF THE TYPE OF DIHYDROXY-DIPHENYLMETHANE AND PROCESS OF MAKING THEM

Erich Haack, Radebeul, near Dresden, Germany; vested in the Alien Property Custodian No Drawing. Application October 3, 1939, Serial No. 297,668. In Germany October 31, 1938

14 Claims. (Cl. 260—325)

The object of my invention is the production of new condensation products from substances containing the dihydroxy-diphenylmethane-group arrangement, and methylolamides of aliphatic, aromatic or mixed aliphatic-aromatic carboxylic acids. These condensation products have a special value as remedies, especially as purgatives, and also as intermediates for the manufacture of remedies. My invention also refers especially to the production of the new substances by the interaction of methylolamides of the organic acids mentioned and compounds containing a dihydroxy-diphenylmethane group of the following kind:

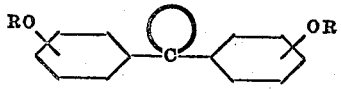

wherein

stands for a five-membered ring containing besides carbon atoms a link taken from the class of oxygen and nitrogen, and R stands for a substituent selected from the class comprising hydrogen, alkyl and acyl. The benzene nuclei may be substituted, e. g. by alkyl groups. Suitable compounds of the type mentioned are e. g. 4,4'-dihydroxy-diphenylmethane and its derivatives when substituted by alkyl or aryl in the methane-group or by alkyl in the benzene nucleus. 4,4'-dihydroxybenzophenones or their alkyl-derivatives respectively alkyl ethers, may also be used in the same way. Further starting materials are for instance the following:

Phenolphthalein and cresolphthalein, diphenol- and dicresolindolinon, hydroxyanthraquinones and others. As acid-amides may be used for instance the amides of the acetic, propionic, butyric, valeric, isovaleric, caproic, caprylic, capric acids and their higher homologues, furthermore of the lactic, phenylacetic, mandelic, benzoic, salicylic and similar acids, also of the carbonic acid in the form of ureas and urethanes.

The foregoing statements are naturally meant to specify only a few of the condensations possible according to my invention.

The reaction between methylolamides of carboxylic acids and phenols or their derivatives is known and takes place e. g. when reacting with methylolacetamide on phenol according to the following equation:

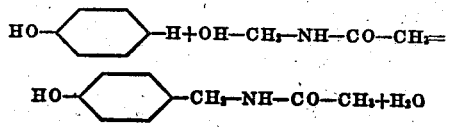

Here, the acylated methylolamine-group may enter into p- or o-position to the phenolic hydroxyl, or two groups may enter into o- and p-position, also in o- and o'-position if the p-position is already taken. But generally only one methylolamide-group enters into reaction with one phenolic hydroxyl, especially if the p-position is taken. The simple compounds of this kind known heretofore are of no technical interest worth mentioning and have no value, especially not as purgatives, while the condensation products as produced according to my invention from compounds containing a dihydroxy-diphenylmethane-group and based on the same reaction scheme, are valuable remedies and purgatives.

As I have found, the condensation of the compounds containing a dihydroxydiphenylmethane group arrangement with the methylolamides of organic carboxylic acids takes place especially well in the presence of condensing agents, e. g. acids like hydrochloric and sulphuric acid, salts like chloride of zinc and other dehydrating agents like phosphorous chloride or oxychloride. According to the general reaction scheme illustrated above, as a rule one or two methylolamide groups enter into the dihydroxydiphenylmethane.

The new condensation products possess a very strong and reliable action as purgatives already per se. However, I have found furthermore, that this action may be increased considerably, if these compounds are brought into a form which when dissolved makes the active substance free in a very fine state of division. This is obtained by imbedding the substance in the finest state of suspension or colloidal division into a soluble colloidal carrier which is able of swelling and digestible and, when dissolved, leaves the substance in such a fine state of division, that it is soluble in the contents of the intestines. The compounds for instance, according to my invention, are dissolved in an alkaline medium, like sodium hydroxide solution, or in an organic solvent, like alcohol, and then precipitated by adding water or acids in the presence of a protecting colloid like gelatine, crystal gum, albuminous substances, decomposition products of starch and such like. Thereby, the active compound separates out in a very fine division so as to allow the formation of a white milk. The latter may be dried carefully or absorbed in other substances. The active substance may also be caused to flocculate from its solutions together with albuminous substances like casein. According to the present invention, the active purgatives may also be put into the finest state of divisior by the most varying methods known and be applied together with substances innocuous to the human body.

My invention is illustrated by the following examples without being restricted thereto.

Example 1

|  | Grams |
|---|---|
| Diphenolisatin | 40 |
| Chloride of zinc | 60 |
| Glacial acetic acid | 120 | are dissolved hot and, after cooling down, mixed with 52 g. methylolamide of isovaleric acid (=3 mol) which dissolves readily. After standing for 24 hours at room temperature, the solution is run in a thin jet into a mixture of 2000 cc. of water and 100 cc. of concentrated hydrochlorid acid. The granular mass is sucked off, washed well with water and hereafter dissolved in 1000 cc. of a 2% sodium hydroxide solution and twice shaken out with ether for removing neutral constituents. After filtering off an insoluble residue, the solution is run with stirring into a mixture of 1000 cc. of water and 50 cc. of concentrated hydrochloric acid and, after standing for some time, sucked off and washed with water. According to this example, the main reaction runs as follows:

$$C_{20}H_{15}O_3N + 2C_4H_9CO-NH-CH_2OH - 2H_2O =$$

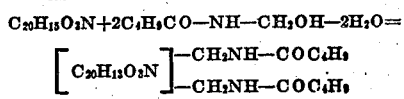

this product containing small quantities of the monosubstituted compound $$(C_{20}H_{14}O_3N)-CH_2NHCOC_4H_9$$

The yield, when dry, is 70 g. as calculated for 1 mol diphenolisatin+2 mol methylolamide of isovaleric acid—2 mol water. The compound dissolves readily in 1% sodium hydroxide solution. The solutions are able to foam and, with potassium ferricyanide, give a violet-red colouring.

Example 2

When using only 1 mol of methylolamide of isovaleric acid, a condensation product is obtained which is similar to that one contained in Example 1 but dissolves more readily. The main reaction runs as follows:

$$C_{20}H_{15}O_3N + C_4H_9CONH-CH_2OH - H_2O =$$
$$(C_{20}H_{14}O_3N)-CH_2NHCOC_4H_9$$

this product containing small quantities of the disubstituted compound shown in Example 1 and of diphenolisatin. The colour reaction with potassium ferricyanide is dark red.

Example 3

When using 65 g. of methylolamide of caprylic acid in Example 1 instead of the 52 g. of methylolamide of isovaleric acid, 91 g. of a condensation product is obtained which shows a blue colouring with potassium ferricyanide in sodium hydroxide solution. This compound contains two caprylic acid amide groups. The main product obtained according to this example may be represented by the formula:

small amounts of the monosubstituted compound shown in Example 4 being present.

Example 4

If according to Example 3 the condensation is carried out with 22 instead of 65 g. methylolamide of caprylic acid, a monocaprylic derivative results. By dissolving the crude product in methylalcohol and precipitating with 2.5% sodium carbonate solution, it can be separated from diphenolisatin which may occur in the raw product but readily dissolves in 2.5% sodium carbonate solution. About 52 g. of a white powder are thus obtained which is easily soluble in 1% sodium hydroxide solution to give foaming solutions; it turns violet upon adding potassium ferricyanide solution. The product has the formula $$C_{20}H_{14}O_3N-CH_2-NH-COC_7H_{15}$$

and generally contains small quantities of the disubstituted product (see Example 3) and of the nonsubstituted diphenolisatin.

Example 5

|  | Grams |
|---|---|
| Diphenolisatin | 30 |
| Chloride of zinc | 60 |
| Glacial acetic acid | 120 | are dissolved hot and after cooling down mixed with 37 g. methylol-α,α-dimethylurea. After heating it to 50° C. for 4 hours, the mass is run into 1500 cc. of water+50 cc. of concentrated hydrochloric acid which being agitated. The precipitate being sucked off and washed, is dissolved in 1000 cc. of 2% sodium hydroxide solution and then precipitated with 2000 cc. of water+50 cc. of concentrated hydrochlorid acid. When dry, 47.5 g. of a white powder are obtained, 49 g. being calculated for 1 mol diphenolisatin+2 mol methylol-α,α-dimethylurea—2 mol water. The formula of this compound is as follows:

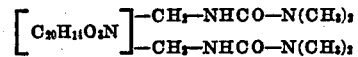

Small quantities of the monosubstituted compound are formed as by-products. The product is difficultly soluble in ether and benzene, but easily dissolves in alcohol and is not precipitated from the alcoholic solution by the addition of 2.5% sodium carbonate solution. The compound gives a violet-red colouring with potassium ferricyanide.

Example 6

If a solution of 20 g. phenolphthalein and 60 g. chloride of zinc in 120 g. glacial acetic acid is condensed with 27 g. methylolamide of caprylic acid at 50° C., a crude product is obtained which after being dissolved in alcohol and precipitated by 2.5% sodium carbonate solution, is dissolved again in caustic soda lye and, after being separated from the insoluble portion, precipitated as a white powder by diluted hydrochlorid acid. According to this example a reaction takes place which may be represented by the following equation:

$$C_{20}H_{14}O_4 + 2C_7H_{15}CO-NH-CH_2OH - 2H_2O =$$

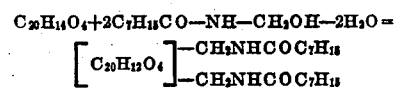

The reaction product contains small quantities of the non-substituted and of the monosubstituted phenolphthalein. The substance dissolves in diluted caustic soda lye with dark violet colour, the solutions foaming strongly.

If the condensation products as described in the examples are to be brought into a finely divided state especially active and suitable for medicinal use, they are dissolved e. g. in an alcoholic solution containing alkali, mixed with gelatine and crystal gum and then precipitated by a watery solution of hydrochloric acid, citric acid or other suitable acids, or the precipitations as described in the foregoing examples are carried out in the presence of protecting colloids. The resulting milky product is brought to dryness in a suitable way, e. g. by treating it with a dry stream of air. Instead of alcohol and caustic soda lye, other solvents may be used, instead of gelatine, other protecting colloids. By using flocculating colloids like casein, the products may also be precipitated in a very fine state of division.

Condensations, corresponding to the examples mentioned above, with methylol-benzamide and methylolamide of salicylic acid take place in the same way as described in the examples. The present invention also includes other variations, e. g. the use of solvents and condensing agents other than acetic acid+chloride of zinc, like concentrated sulphuric acid. In a similar way, the hydroxy- or alkoxy-diphenylmethane derivatives mentioned in the description, may also be condensed with methylolamides of acids.

What I claim is:

1. Process for the production of condensation products, which consists in reacting with methylol compounds of the amides of organic acids taken from the class comprising the fatty and hydroxy-fatty acids, the phenylacetic and phenylhydroxy-acetic acids, the benzoic and hydrobenzoic acids, the carbamic acids and alkoxycarbonic acids on compounds of the following formula:

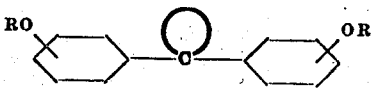

wherein

stands for a five-membered ring containing four carbon atoms and one hetero atom of the group consisting of oxygen and nitrogen, and R stands for a substituent selected from the class comprising hydrogen, alkyl and acyl.

2. A new compound of the following composition:

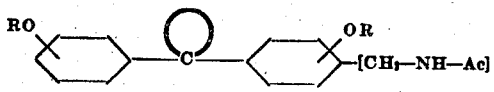

wherein

stands for a five-membered ring containing four carbon atoms and one hetero atom of the group consisting of oxygen and nitrogen and R stands for a substituent selected from the class comprising hydrogen, alkyl and acyl, while Ac represents the radical of an organic acid taken from the class comprising the fatty and hydroxyfatty acids, the phenylacetic and phenylhydroxyacetic acids, the benzoic and hydroxybenzoic acids, the carbamic acids and the alkoxycarbonic acids.

3. A new compound of the following composition:

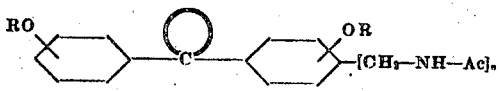

wherein

stands for a five-membered ring containing four carbon atoms and one hetero atom of the group consisting of oxygen and nitrogen and R stands for a substituent selected from the class comprising hydrogen alkyl and acyl, while Ac represents a radical of an organic acid taken from the class comprising the fatty and hydroxyfatty acids, the phenyl- and phenyl-hydroxyacetic acids, the benzoic and hydroxybenzoic acids, the carbamic acids and the alkoxycarbonic acids, $n$ is a number from 1 to 4.

4. A new compound of the following composition:

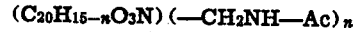

wherein Ac represents the radical of an organic acid taken from the class comprising fatty and hydroxyfatty acids, the phenylacetic and phenylhydroxyacetic acids, the benzoic and hydroxybenzoic acids, the carbamic acids and the alkoxycarbonic acids, $n$ is a number from 1 to 4.

5. A new compound of the following composition:

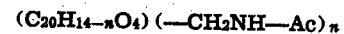

wherein Ac represents the radical of an organic acid taken from the class comprising fatty and hydroxyfatty acids, the phenylacetic and phenylhydroxyacetic acids, the benzoic and hydroxybenzoic acids, the carbamic acids and the alkoxycarbonic acids, $n$ is a number from 1 to 4.

6. A new compound of the following composition:

wherein $n$ represents a number from 1 to 4, these compounds being easily soluble in 1% sodium hydroxide solution and giving solutions capable of foaming and turning a violet red colour upon adding potassium ferricyanide.

7. A new compound of the following composition:

wherein $n$ represents a number from 1 to 4, these compounds being white powders easily soluble in 1% sodium hydroxide solution to give foaming solutions which turn violet to blue, when adding potassium ferricyanide.

8. A new compound of the composition:

wherein $n$ represents a number from 1 to 4, these compounds difficultly soluble in ether and benzene, but readily soluble in alcohol, and not precipitating from the alcoholic solution by a 2.5% sodium carbonate solution and giving a violet red colour reaction with potassium ferri-cyanide.

9. A new compound of the following composition:

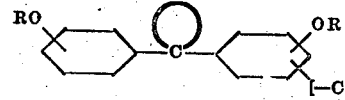

wherein

stands for a five-membered ring containing four carbon atoms and one hetero atom of the group consisting of oxygen and nitrogen and R stands for a substituent selected from the class comprising hydrogen alkyl and acyl, while Ac represents a radical of an organic acid taken from the class comprising the fatty and hydroxy-fatty acids, the phenyl- and phenylhydroxyacetic acids, the benzoic and hydroxybenzoic acids, the carbamic acids and the alkoxycarbonic acids, $n$ is a number from 1 to 4, the compounds being in a colloidal state of fine division in a protecting colloid.

10. A new compound of the following composition:

$$(C_{20}H_{15-n}O_3N)(-CH_2NH-Ac)_n$$

wherein Ac represents the radical of an organic acid taken from the class comprising the fatty and hydroxyfatty acids, the phenylacetic and phenylhydroxyacetic acids, the benzoic and hydroxybenzoic acids, the carbamic acids and the alkoxycarbonic acids, and $n$ is a number from 1 to 4, the compounds being in a colloidal state of fine division in a protecting colloid.

11. A new compound of the following composition:

$$(C_{20}H_{14-n}O_4)(-CH_2NH-Ac)_n$$

wherein Ac represents the radical of an organic acid taken from the class comprising the fatty and hydroxyfatty acids, the phenylacetic and phenylhydroxyacetic acids, the benzoic and hydroxybenzoic acids, the carbamic acids and the alkoxycarbonic acids, and $n$ is a number from 1 to 4, the compounds being in a colloidal state of fine division in a protecting colloid.

12. A new compound of the following composition:

$$(C_{20}H_{15-n}O_3N)(-CH_2-NH-COC_4H_9)_n$$

wherein $n$ represents a number from 1 to 4, these compounds being easily soluble in 1% sodium hydroxide solution, and giving solutions capable of foaming and turning a violet red colour upon adding potassium ferricyanide, the compounds being in a colloidal state of fine division in a protecting colloid.

13. A new compound of the following composition:

$$(C_{20}H_{15-n}O_3N)(-CH_2-NH-COC_7H_{15})_n$$

wherein $n$ represents a number from 1 to 4, these compounds being white powders easily soluble in 1% sodium hydroxide solution to give foaming solutions which turn violet to blue, when adding potassium ferricyanide, the compounds being in a colloidal state of fine division in a protecting colloid.

14. A new compound of the following composition:

$$(C_{20}H_{14-n}O_4)(-CH_2-NH-CON(CH_3)_2)_n$$

wherein $n$ represents a number from 1 to 4, these compounds difficultly soluble in ether and benzene, but readily soluble in alcohol, and being not precipitated from the alcoholic solution by a 2.5% sodium carbonate solution and giving a violet red colour reaction with potassium ferricyanide, the compounds being in a colloidal state of fine division in a protecting colloid.

ERICH HAACK.